United States Patent [19]

Rosenblatt

[11] Patent Number: 4,753,077
[45] Date of Patent: Jun. 28, 1988

[54] MULTI-STAGED TURBINE SYSTEM WITH BYPASSABLE BOTTOM STAGE

[75] Inventor: Joel H. Rosenblatt, Big Pine Key, Fla.

[73] Assignee: Synthetic Sink, Miami, Fla.

[21] Appl. No.: 56,591

[22] Filed: Jun. 1, 1987

[51] Int. Cl.$^4$ .......................... F01K 9/00; F01K 13/02
[52] U.S. Cl. ....................................... 60/661; 60/663; 60/677; 60/686
[58] Field of Search ................. 60/661, 663, 686, 677, 60/690, 692, 694, 697

[56] References Cited

U.S. PATENT DOCUMENTS

| | | | |
|---|---|---|---|
| 2,982,864 | 5/1961 | Furreboe . | |
| 4,042,809 | 8/1977 | Shetler | 60/663 X |
| 4,291,538 | 9/1981 | Husain et al. | 60/661 |
| 4,455,836 | 6/1984 | Binstock et al. | 60/663 |
| 4,471,446 | 9/1984 | Podolsky et al. | 364/494 |
| 4,471,620 | 9/1984 | Binstock et al. | 60/653 |
| 4,503,682 | 3/1985 | Rosenblatt | 60/671 |

Primary Examiner—Allen M. Ostrager
Attorney, Agent, or Firm—Lockwood, Alex, Fitzgibbon & Cummings

[57] ABSTRACT

An improved multi-stage turbine system is provided which includes a high pressure turbine stage assembly and at least one lower pressure turbine stage assembly. Each of these turbine assemblies preferably has an inlet opening for introducing a thermodynamic medium in the form of a vapor and a discharge opening for discharging the thermodynamic medium from the turbine assembly at a reduced temperature and pressure. Each of the turbine assemblies is typically mounted on a rotatable shaft and these shafts may be coaxially aligned. An assembly such as a clutch may be provided for releasably interlocking the shafts. The thermodynamic medium is transported, when operating conditions are suitable, from the discharge opening of the high pressure turbine assembly to the inlet opening of the lower pressure turbine assembly. When operating conditions are not thus suitable, the thermodynamic medium is transported from the discharge opening of the high pressure turbine assembly to an apparatus for vapor liquification such as a condenser.

20 Claims, 3 Drawing Sheets

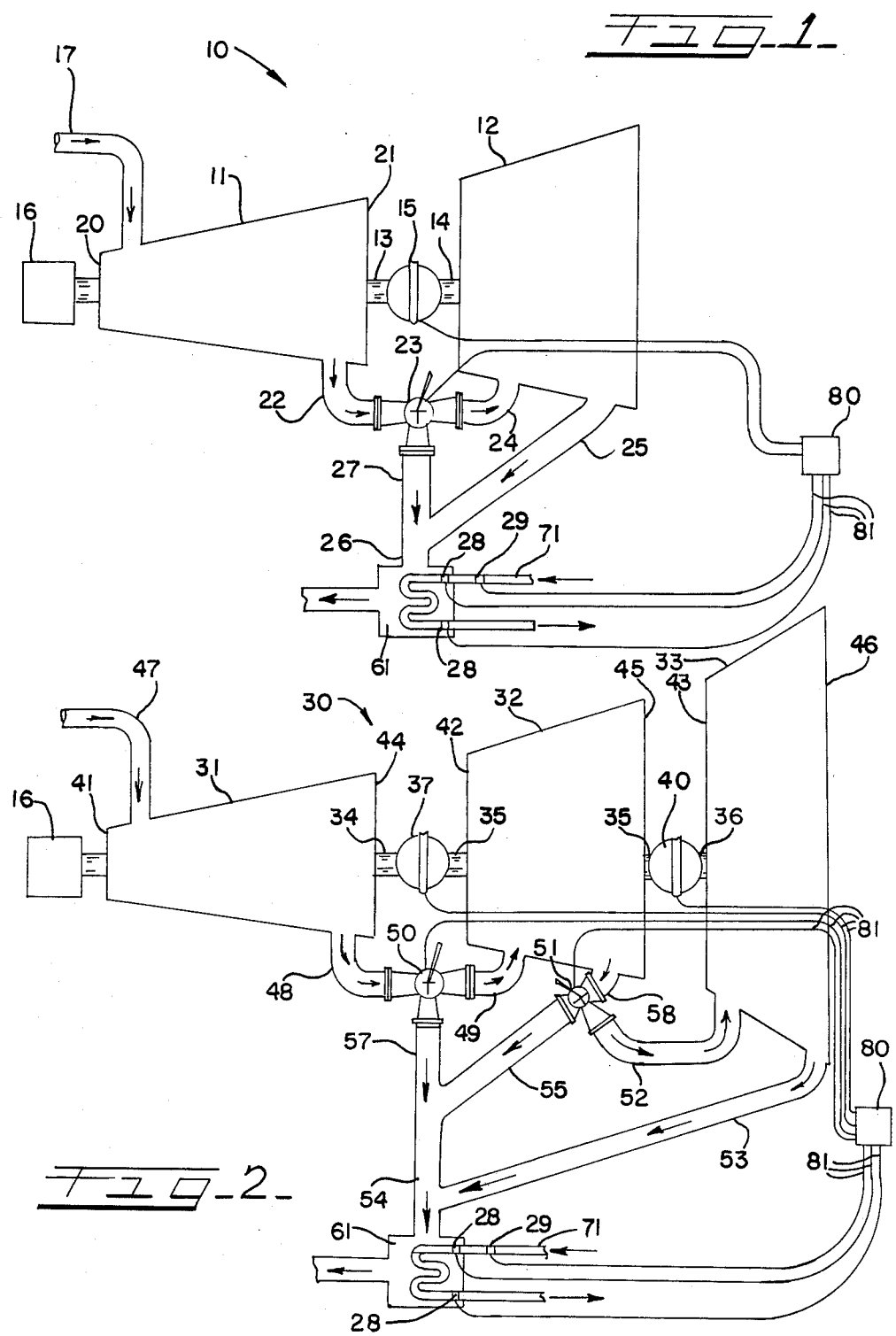

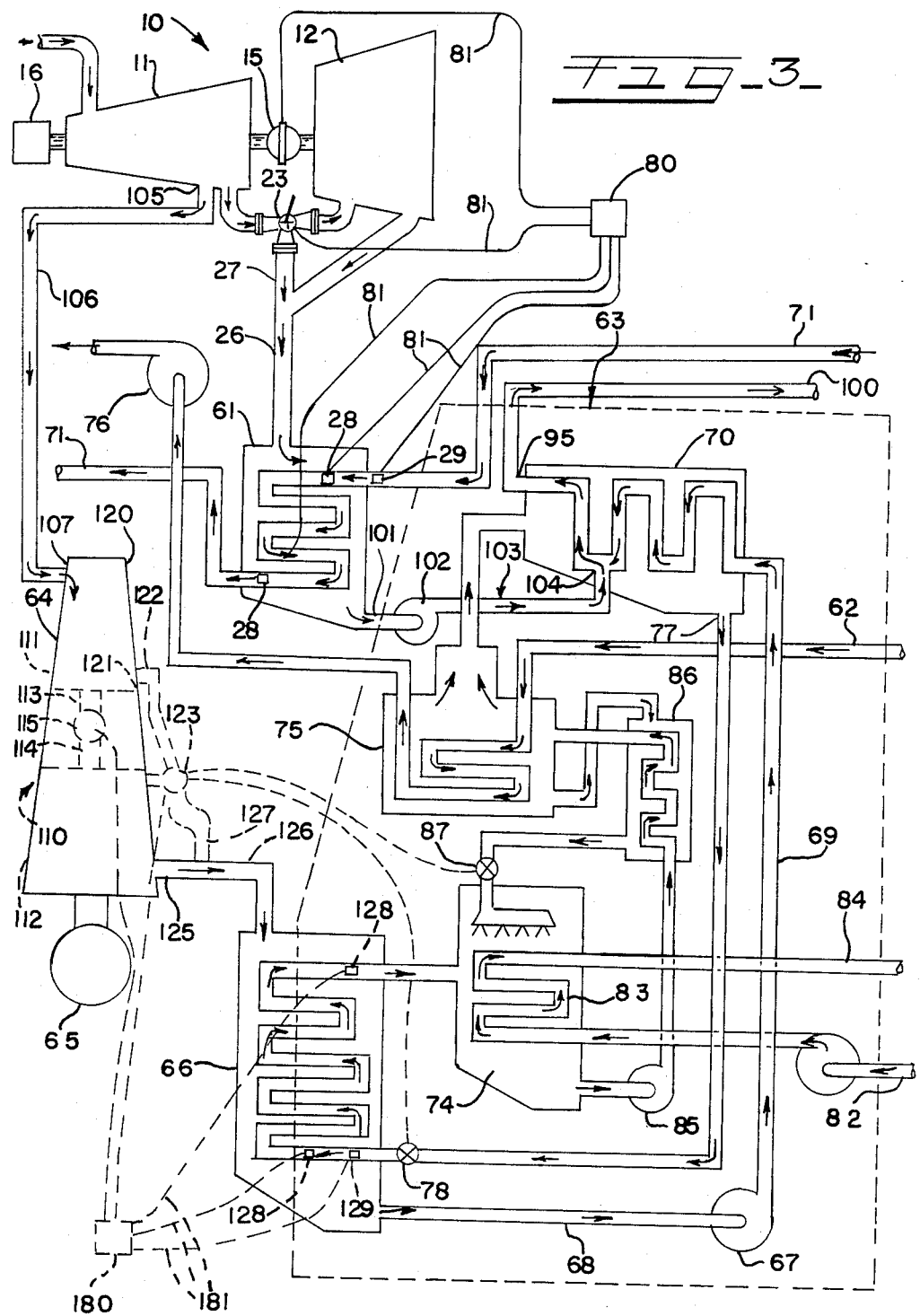
FIG_3

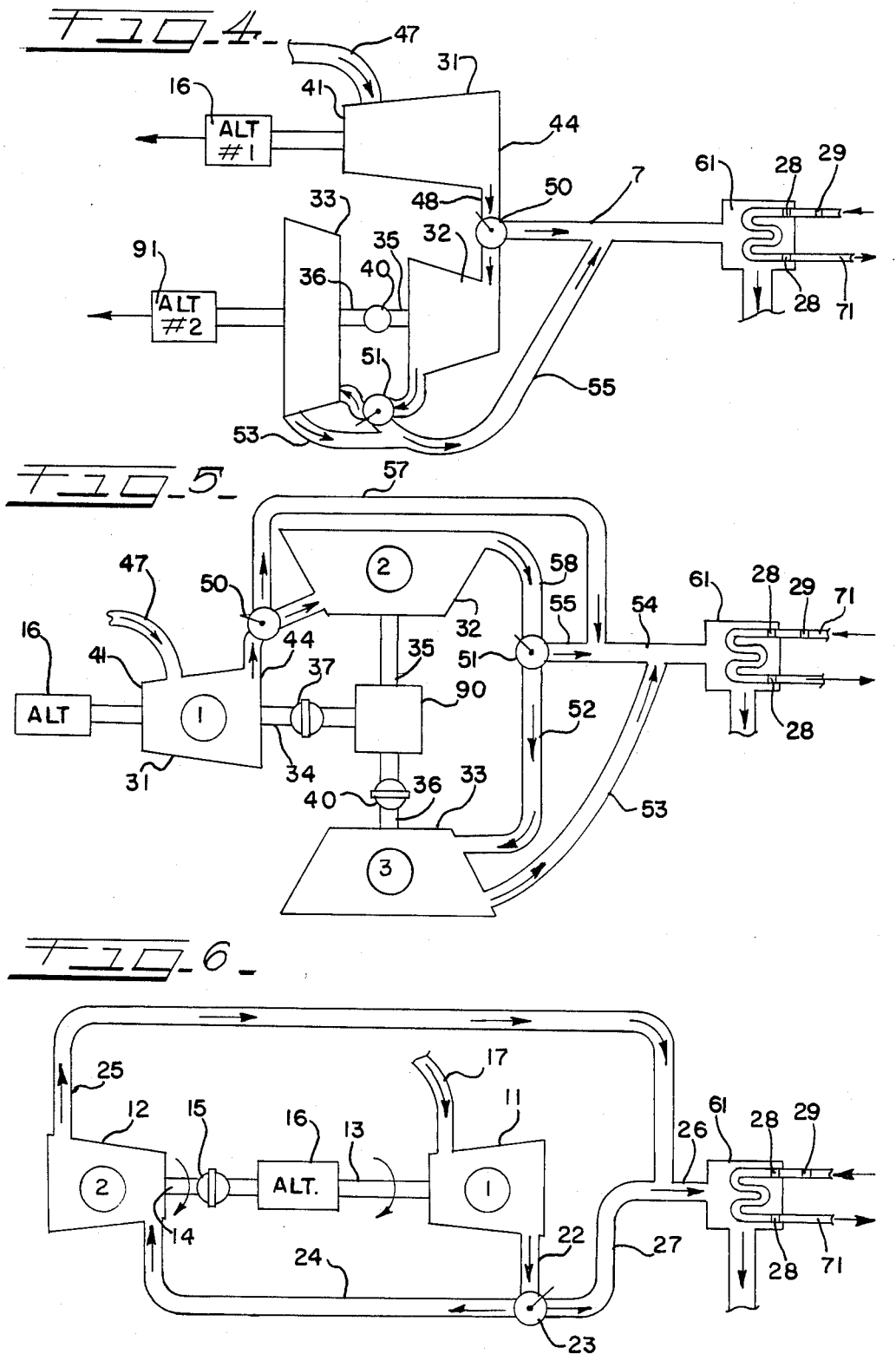

MULTI-STAGED TURBINE SYSTEM WITH BYPASSABLE BOTTOM STAGE

BACKGROUND AND SUMMARY OF THE INVENTION

The present invention generally relates to turbine systems and, more particularly, to power plant multi-staged turbine systems which have one or more bypassable bottom stages that are utilized or bypassed in response to temperature changes in the cooling sink of the power plant.

A typical turbine power plant utilizes a heat source, such as, for example, fuel combustion, to produce a vapor. The vapor enters the turbine portion of the system and expands as it travels through the turbine causing the turbine to rotate. This turbine in turn drives an electrical generator which produces electricity. As the vapor exits the turbine at a lower temperature and pressure, it enters a condenser wherein the vapor is cooled via heat transfer with a cooling medium until it condenses to a liquid. The condensed liquid is then pumped back to the heat source where it begins the cycle once again.

Although various heating, cooling and routing configurations can be utilized, the efficiency with which a turbine system produces work is largely a matter of the temperature difference between the hot inlet source as it enters the turbine and the cold cooling source used to condense the thermodynamic medium after it exits from the turbine. The theoretical Carnot efficiency of a heat engine is defined by the following equation:

Carnot efficiency $= (1 - T_L/T_H) \times 100$

Where $T_L$ = the temperature of the cooling source in degrees Kelvin $T_H$ = the temperature of the hot source in degrees Kelvin Although the maximum efficiency calculated by this equation is only theoretical, it does allow a useful comparison for determining the effect of a change in cooling source temperature. From this equation it is apparent that the greater the temperature differential between the hot and cold sources, the greater the efficiency of the system. Consequently, for a fixed high temperature input, a reduction in the temperature of the cooling source will increase the efficiency at which a turbine system will operate and thus increase its power output.

Turbine power plants typically utilize ambient air or water as their cooling medium. In certain geographic areas, the temperature of the cooling medium may fluctuate 50° F. or more between the summer and winter. However, because the power plants must operate throughout the entire year, the designer cannot take full advantage of the colder cooling temperatures available at night or during the winter. Rather, the power plant must be designed so that it will operate even when the cooling medium is at its maximum summer temperature.

As can be seen in the aforementioned equation for determining Carnot efficiency, if the high temperature source remains at a constant temperature and the temperature of the cooling medium is reduced, the efficiency of the system will increase. Likewise, on the hottest summer day, the power plant's efficiency will be at a minimum, which must be taken into consideration in designing the power plant.

Another consideration is the inherent limit on the vacuum that can be developed by condensers used at steam power plants or the like. A typical condenser of this type can pull a vacuum of about 2½ inches Hg. at a temperature of 108.7° F. Even if it is desired to attempt to cool the condenser under optimum conditions, i.e., flowing river water at about 33° F., it is still not possible to pull a vacuum lower than 2½ inches Hg. because of the physical limitations of the equipment. As a result, the theoretical advantage available due to the colder condenser fluid source cannot be translated into an actual advantage for a condenser of a given size.

Thus, the potential exists for taking advantage of the increased operating efficiency which is available during the cooler time periods such as, for example, the winter months. Accordingly, it would be desirable to utilize a system or arrangement which would take full advantage of the highest efficiency available to the turbine system at all times.

The turbine system of the present invention takes advantage of the additional power available by utilizing additional turbine stages to extract additional work from the vapor at those times of the year when a lower cooling medium temperature is available. The present invention increases the overall efficiency and power output of a power plant by tracking the temperature of the cooling medium and increasing or decreasing the number of turbine stages through which the vapor passes in order to take maximum advantage of the available energy.

The turbine system of the present invention includes a multi-staged turbine with a high pressure turbine section and at least one lower pressure turbine section. Each of the turbine sections has an inlet opening for introducing a vaporized thermodynamic medium, such as, for example, a vaporized organic fluid, into the turbine section and a discharge opening for discharging the thermodynamic medium from the turbine section at a reduced temperature and pressure. The thermodynamic medium utilized in the turbine system should be selected to possess the most advantageous thermodynamic properties for the temperature regimen across which it must operate. Each of the turbine sections is mounted on a rotatable shaft. A linking conduit is provided for transporting the thermodynamic medium from the discharge opening of the high pressure turbine section to the inlet opening of the next lower pressure turbine section. A discharge conduit is provided at each turbine section for transporting the thermodynamic medium from the discharge opening of the respective pressure turbine sections to a mechanism for vapor liquification. A valve assembly may be used for selectively directing the thermodynamic medium through the linking and discharge conduits. The shafts of the lower pressure turbine stages may be provided with a clutch assembly for releasably interlocking the turbine section shafts so that the work done by the lower pressure turbine stages can be captured as electrical energy.

It is accordingly a general object of the present invention to provide an improved multi-stage turbine system.

Another object of this invention is to provide a multi-stage turbine system having at least one bypassable lower pressure turbine stage.

Another object of the present invention is to provide a power plant with a multi-stage turbine system having at least one bypassable lower pressure stage in which the lower pressure stage is bypassed in response to an increase in the cooling medium temperature of the power plant.

Another object of the present invention is to provide a turbine system designed to employ a circulating thermodynamic medium capable of being expanded to a saturation pressure at a readily attainable level at which condensation of the exhaust from the lowest stage can be effected at the lowest temperature made available by the lowest available ambient sink temperature.

Another object of the present invention is to provide a multi-stage turbine system with at least one bypassable lower pressure stage in which vapor, in response to a decrease in cooling medium temperature, is directed to the next lower pressure stage through which vapor was not previously passing.

Another object of the present invention is to provide a multi-stage turbine system having an overall increase in operating efficiency.

These and other objects, features and advantages of the present invention will be clearly understood through a consideration of the following detailed description.

BRIEF DESCRIPTION OF THE DRAWINGS

In the course of this description, reference will frequently be made to the attached drawings in which:

FIG. 1 is a schematic, elevational view illustrating an embodiment of the turbine system with a bypassable bottom stage;

FIG. 2 is a schematic, elevational view illustrating another embodiment of this invention which provides enhanced flexibility in tracking the cooling medium temperature;

FIG. 3 is a schematic, elevational view illustrating an embodiment of the present invention incorporated into a low temperature engine system;

FIG. 4 is a schematic, elevational view illustrating another embodiment of this invention which provides enhanced flexibility in tracking the cooling medium temperature and which utilizes two alternators for the production of electricity;

FIG. 5 is a schematic, elevational view illustrating another embodiment of this invention which provides enhanced flexibility in tracking the cooling medium temperature; and FIG. 6 is a schematic, elevational view illustrating another embodiment of this invention which provides enhanced flexibility in tracking the cooling medium temperature.

DESCRIPTION OF THE PARTICULAR EMBODIMENTS

The turbine system according to the present invention includes a multi-staged turbine, generally designated as 10 in FIG. 1. Multi-staged turbine 10 includes a high pressure stage assembly 11 and at least one lower pressure stage assembly 12 which may be selectively bypassed.

Each of the high pressure stage assembly 11 and the lower pressure stage assembly 12 of turbine 10 has a turbine assembly mounted on shafts 13 and 14, respectively, that are coaxially aligned with each other. When desired, shafts 13 and 14 may be secured to one another through a clutch assembly 15 in order to prevent relative rotation of the shafts 13 and 14 at selected times. Clutch assembly 15 may be a mechanical clutch or any other type of engagement and disengagement assembly that is capable of withstanding the torque produced by the pressure stage assemblies of the invention. The end of shaft 13 which is opposite to clutch assembly 15 can be utilized to drive an alternator 16 which will produce electricity upon rotation of the turbine 10.

A thermodynamic medium, for example, a hydrocarbon fluid, is heated by a heat energy input source (not shown) of known type until the medium is a high pressure, high temperature vapor. This vapor passes through conduit 17 into the input or high pressure end 20 of high pressure stage 11. As the vapor passes through the high pressure stage 11, the vapor expands causing the turbine to rotate, whether clockwise or counterclockwise. The vapor exits the low pressure end 21 of high pressure stage 11 through discharge conduit 22 as a vapor of lower pressure and temperature.

After the lower pressure and temperature vapor exits through discharge conduit 22, it enters a two-way bypass valve 23 which allows selective communication with either the lower pressure stage assembly 12 or with a condenser 61 of the engine system in which the turbine assembly is incorporated. If the temperature of the cooling medium circulating through conduit 71 in condenser 61 is low enough and the flow rate therethrough is great enough to permit further expansion of the vapor and still provide enough of a temperature differential in the condenser to permit liquification of the vapor therein, the bypass valve 23 is positioned such that the vapor exiting the high pressure stage assembly 11 is directed into the lower pressure turbine stage assembly 12. The vapor passes through bypass valve 23 into a linking conduit 24 that serves as an inlet into the lower pressure turbine stage assembly 12. While valve 23 is in this position, clutch assembly 15, when provided, is engaged to create a unitary turbine structure in which the shafts 13 and 14 are locked together.

As the vapor travels through lower pressure turbine stage assembly 12, it again expands to even lower pressure and temperature conditions. This expansion causes the lower pressure turbine stage assembly 12 to rotate in the same direction as the high pressure turbine stage assembly 11. After this further expansion, the exhaust vapor exits the lower pressure turbine stage assembly 12 through a discharge conduit 25 and travels through a condenser conduit 26 into the condenser 61. The vapor is liquified in the condenser 61 in known manner, pumped back to the heat source to be heated into a vapor and then directed to the input conduit 17 of the turbine 10 in accordance with conventional condensate return system practices.

In the event that the ambient cooling medium of the engine system or power plant is so warm or the flow rate so slow that it is not possible to achieve liquification within the condenser 61 of the vapor from the lower pressure stage assembly 12, the bypass valve 23 is repositioned to direct the vapor flow into a bypass conduit 27. The vapor thus bypasses the lower pressure stage assembly 12 and travels through bypass conduit 27 into condenser conduit 26 and then into the condenser 61. After liquification of the vapor within the condenser 61, the thermodynamic medium is pumped back to the heat source as described above.

When valve 23 is in this bypass position, the clutch assembly 15 is preferably disengaged so that shafts 13 and 14 can rotate independently. Since no vapor is entering the lower pressure stage assembly 12 and expanding therethrough, the rotating components of lower pressure turbine stage assembly 12 "free-wheel" when the drive shaft 14 has been thus disengaged until they ultimately stop due to frictional and windage losses. Lower pressure turbine stage 12 will remain substantially stationary until clutch 15 is engaged and/or bypass valve 23 redirects vapor through linking conduit 24 into the lower pressure stage assembly 12.

At a time when the temperature of the cooling medium of the engine system or power plant is cool enough and/or the flow rate great enough to achieve liquification within the condenser 61 of the vapor exiting from the lower pressure stage assembly 12, bypass valve 23 can again be repositioned to direct the vapor exiting the high pressure stage assembly 11 through the linking conduit 24 and into the lower pressure stage assembly 12. Clutch assembly 15 may then be actuated to once again lock shafts 13 and 14 together to prevent relative rotation therebetween so that the work generated by both of the pressure stage assemblies is transmitted to the alternator 16. It should be noted that clutch 15 may be actuated either initially upon such repositioning of the valve 23 to allow the entrance of vapor into low pressure stage assembly 12 or same may be postponed until after the rotating components of lower pressure stage assembly 12 have achieved a rotational speed similar to that of high pressure stage assembly 11. By such postponement, wear on clutch assembly 15 and the shock associated with the sudden engagement thereof may be avoided.

In order to operate the bypassable turbine system 10 more efficiently, temperature sensors 28, flow meter 29 and other known measuring devices can be utilized to measure the temperature and flow rate of the cooling medium within conduit 71 of condenser 61, which will be affected by the temperature and heat values of the heat sink of the engine system or power plant.

In conventional turbine systems, the condenser cooling medium temperature being sensed will directly respond to ambient conditions at the site through the use of a cooling tower or by heat exchange with the coldest available body of water at the site. The present invention can be designed to take advantage of the availability of ambient temperatures below the freezing point of water by utilizing a cooling medium which has a freezing point lower than the lowest ambient temperature condition that would be expected at the site of the installation. Exemplary cooling media in this regard include ambient air, water including anti-freeze components and other fluids possessing suitable freezing temperatures. In installations equipped with a low temperature engine system such as that disclosed in U.S. Pat. No. 4,503,682, the condenser may be cooled by another cooling medium as illustrated in FIG. 3. By monitoring the temperature of the cooling medium and its flow rate through the condenser 61, redirection of the vapor flow exiting the high pressure turbine assembly 11 can be carried out substantially automatically and as soon as the cooling medium temperature and/or flow rate changes sufficiently to require such a redirection.

Additionally, temperature and flow rate information can be fed through conductors 81 to a control system 80 which controls the direction of flow through bypass valve 23. Through the use of such a control system 80, the flow through bypass valve 23 may be automatically redirected if the condenser cooling medium conditions have changed sufficiently such that either liquification of the vapor exiting from the next lower pressure stage can be achieved or the condenser can no longer liquify the vapor exiting from the lowest pressure turbine assembly through which vapor is currently passing. It should be noted, however, that this valve repositioning may also be performed manually. If desired, control system 80 can further be used to control the engagement of clutch 15.

Another embodiment of the multi-stage turbine assembly according to the present invention, indicated generally at 30, is shown in FIG. 2. This embodiment has two bypassable stage assemblies available. Multi-stage turbine 30 includes a high pressure stage assembly 31, one or more lower pressure or mid-pressure stage assemblies 32 and a lowest pressure stage assembly 33. As with the system shown in FIG. 1, each of the stages has a turbine assembly mounted on coaxially aligned shafts 34, 35 and 36, respectively. When desired, shafts 34 and 35 may be secured together by actuating a clutch assembly 37 or the like in order to prevent relative rotation of shafts 34 and 35. In addition, shafts 35 and 36 may also be secured together by actuating a clutch assembly 40 or the like in order to prevent relative rotation between shafts 35 and 36. As with the aforementioned system, each turbine assembly 31, 32 and 33 has an inlet or high pressure end 41, 42 and 43, respectively, through which vapor enters the turbine stage assembly, and a discharge or low pressure end 44, 45 and 46, respectively, through which vapor at a lower temperature and pressure is discharged.

In operation, high temperature, high pressure vapor passes through inlet conduit 47 into the inlet or high pressure end 41 of high pressure stage assembly 31. The vapor expands through the turbine assembly 31 causing the high pressure stage to rotate. The vapor exits the low pressure end 44 of high pressure stage assembly 31 through discharge conduit 48 as a vapor of lower pressure and temperature.

After the lower pressure and temperature vapor exits through discharge conduit 48, it enters mid-pressure bypass valve 50. If the temperature of the cooling medium in conduit 71 is low enough and/or the flow rate great enough to permit further expansion of the vapor through mid-pressure stage assembly 32 yet still provide enough of a temperature differential in the condenser to permit liquification of the vapor therein, the bypass valve 50 is repositioned to direct the vapor exiting the high pressure stage assembly 31 into mid-pressure linking conduit 49 through which it enters the mid-pressure turbine stage assembly 32. While valve 50 is directing the vapor from high pressure stage assembly 31 to mid-pressure stage assembly 32, clutch assembly 37, when provided, is engaged, thus locking shafts 34 and 35 together to create a unitary turbine structure composed of high pressure stage assembly 31 and mid-pressure stage assembly 32. As stated above, upon repositioning the two-way bypass valve 50, clutch assembly 37 can either be engaged instantaneously or after the rotating components of mid-pressure stage assembly 32 reach or approximate the rotational speed of the high pressure stage assembly 31.

Once the vapor enters the mid-pressure stage assembly 32, it expands through the assembly at a pressure and temperature condition that is lower than that of the high pressure stage assembly 31. This expansion causes the mid-pressure stage assembly 32 to rotate in the same direction as high pressure stage assembly 31. After this further expansion, the exhaust vapor exits the mid-pressure turbine stage assembly 32 through a discharge conduit 58 and enters a low pressure bypass valve 51. As with the mid-pressure bypass valve 50, if the temperature of the cooling medium is low enough and/or the flow rate great enough to permit further expansion of the vapor through the lowest pressure stage assembly 33 yet still provide enough of a temperature differential in the condenser 61 to permit liquification of the vapor therein, the bypass valve 51 is positioned to direct the vapor exiting the mid-pressure stage assembly 32 into low pressure linking conduit 52 through which it enters the lowest pressure turbine stage assembly 33. While valve 51 is directing the vapor from mid-pressure stage assembly 32 to the lowest pressure stage assembly 33, clutch assembly 40, when provided, is engaged thus locking shafts 35 and 36 together so that all of the turbine stages turn as a unitary structure.

As the vapor enters the lowest pressure stage assembly 33, it expands to a pressure and temperature condition that is lower than that of the high pressure stage assembly 31 and that of the mid-pressure stage assembly 32. This expansion causes the lowest pressure stage 33 to rotate in the same direction as both the high and the mid-pressure stages. After this further expansion, the exhaust vapor exits the lowest pressure turbine stage assembly 33 through discharge conduit 53 and then passes into the condenser conduit 54 through which it travels to the condenser 61. As described previously herein, after the vapor is liquified in the condenser 61, it is pumped to the heat source via a conventional condensate return system where it is heated into a vapor and then directed to the input conduit 47 of the turbine 30.

When the cooling medium within conduit 71 of condenser 61 becomes too warm or the flow rate through the condenser too low to achieve liquification within the condenser 61 of the vapor exiting from the lowest pressure stage assembly 33, bypass valve 51 is repositioned to direct the vapor flow from low pressure linking conduit 52 to low pressure bypass conduit 55. The vapor thus bypasses the lowest pressure stage assembly 33 and travels through low pressure bypass conduit 55 into condenser conduit 54 through which it enters the condenser 61. After liquification, the medium is pumped back to the heat source as described above.

When valve 51 is in this bypass position, the clutch assembly 40 is preferably disengaged so that shafts 35 and 36 are capable of rotating independently. Because no vapor is entering the lowest pressure stage assembly 33 and expanding therethrough, the rotating components of the lowest pressure turbine stage assembly 33 "free-wheel" when the drive shaft 36 has been thus disengaged until they ultimately stop due to frictional and windage losses. The rotating components of the lowest pressure stage assembly 33 will remain stationary until clutch assembly 40 is engaged and/or until the bypass valve 51 redirects vapor through the low pressure linking conduit 52 into the lowest pressure stage assembly 33.

If the temperature of the engine system or power plant cooling medium within conduit 71 becomes too warm or flow rate too low to have the condenser 61 effect adequate liquification of the vapor exiting from the mid-pressure stage assembly 32, mid-pressure bypass valve 50 is repositioned so that the vapor bypasses mid-pressure stage assembly 32 and the lowest pressure stage assembly 33. The vapor travels directly from the mid-pressure bypass valve 50 through mid-pressure bypass conduit 57 into condenser conduit 54 and then into the condenser 61. Mid-pressure clutch assembly 37, when provided, is disengaged to allow shafts 34 and 35 to rotate independently as described above.

Because no vapor is entering the mid-pressure stage assembly 32 and expanding therethrough, the rotating components of the mid-pressure stage assembly 32 "free-wheel" when the drive shaft 35 has been thus disengaged until they ultimately stop due to frictional and windage losses. Mid-pressure stage assembly 32 will remain stationary until clutch assembly 37 is engaged and/or until bypass valve 50 redirects vapor through mid-pressure inlet conduit 49 into the mid-pressure stage assembly 32.

Alternatively, if the temperature of the engine system or power plant cooling medium decreases and/or the flow rate increases sufficiently to allow the further expansion of the vapor through the lowest pressure stage assembly 33 yet still provide enough of a temperature differential in the condenser 61 between the exhaust vapor from the lowest pressure stage assembly 33 and the cooling medium to permit liquification therein, the low pressure bypass valve 51 is repositioned to direct the vapor exiting the mid-pressure stage assembly 32 into the lowest pressure stage assembly 33. Low pressure clutch 40 is then engaged, either immediately or once the lowest pressure stage assembly 33 has achieved the desired rotational speed, in order to lock shafts 35 and 36 together.

The temperature sensing devices 28, flow meter 29, conductors 81 and the control system 80 for the second system 30 illustrated in FIG. 2 are essentially identical to those of the system 10 of FIG. 1 except that the control system of the FIG. 2 embodiment also controls the additional bypass valve and clutch.

Additional embodiments of the multi-stage turbine assemblies of the present invention are shown in FIGS. 4–6. The ducts, valves and control system used in each of FIGS. 4–6 are substantially identical to those of the embodiment shown in FIGS. 1 and 2, and accordingly, are provided with identical reference numerals. In the embodiments of FIGS. 4–6, it can be possible for individual turbine stages to rotate in either a clockwise or a counterclockwise direction, depending on how the turbine stages are designed.

FIG. 4 depicts an embodiment in which high pressure stage 31 drives a first alternator 16 and, when the cooling medium conditions are appropriate, mid-pressure turbine stage 32 and low pressure turbine stage 33 drive a second alternator 91.

The turbine system shown in FIG. 5 is similar to that shown in FIG. 2 except that rather than the shaft 35 of mid-pressure stage 32 being coaxial with the shaft 34 of high pressure stage 31, shaft 35 is positioned at a 90° angle to shaft 34. A right angle gear box 90 of known type is used to transfer the power from mid-pressure turbine stage 32 to shaft 34 of high pressure turbine stage 31. If desired, a third or low pressure stage 33 can also be provided with its shaft 36 positioned at an angle to shaft 34 of high pressure turbine stage 31. As depicted in FIG. 5, power from low pressure turbine stage 33 can also be transferred to shaft 34 through right angle gear box 90.

FIG. 6 depicts an embodiment in which the shaft 13 of high pressure turbine stage 11 is coaxial with shaft 14 of lower pressure turbine stage 12 but low pressure turbine stage 12 is located such that its shaft 14 directly drives alternator 16 when vapor is provided to the low pressure stage.

Thus, it can be seen that the systems of the present invention, regardless of their configuration, will operate in a particular condition and configuration until the temperature of the cooling medium flowing through the condenser 61 or the flow rate of same changes sufficiently to necessitate or allow a reconfiguration of the vapor flow through each of the systems.

If at any time during operation the cooling medium flowing through the condenser becomes too warm or the flow rate too low to achieve liquification of the vapor entering the condenser, the valve used for bypassing the lowest pressure stage currently operating will be repositioned in order to bypass that particular stage. Additionally, if a clutch is located between the drive shaft of that stage and that of the next higher pressure stage, the clutch can be disengaged in order to allow the lower pressure stage to "free-wheel". By disengaging the turbine stages which are not currently being utilized, frictional and windage losses will be minimized or eliminated.

If at any time the temperature of the cooling medium decreases and/or the flow rate increases sufficiently to achieve liquification in the condenser 61 of the vapor exiting from the next lower pressure turbine stage through which vapor is not presently passing, the valve bypassing this next lower stage is repositioned to direct vapor through the next lower pressure stage before the vapor enters the condenser. If the system is one which utilizes clutches between the output shafts of the various stages, upon repositioning the bypass valve to direct flow through the next lower pressure turbine stage, the clutch which engages the output shaft of that turbine stage and the shaft of the next higher pressure stage may be engaged either immediately upon such repositioning or postponed until the lower pressure stage has achieved a rotational speed similar to that of the higher pressure rotating stage.

The cooling medium flowing through condenser 61 comes from the natural heat sink (not shown). All or a portion of the thermodynamic medium in circulation may also be condensed in the heat sink synthesized at a below ambient temperature, such as, for example, a low temperature engine system incorporating a synthetic heat sink which is disclosed in my previous U.S. Pat. No. 4,503,682, the disclosure of which is hereby incorporated by reference hereinto. The inclusion of the present invention into a synthetic heat sink system is generally shown in FIG. 3, which utilizes a low temperature engine system that includes a low temperature turbine 64 that drives, for example, an alternator 65 to produce electricity. As vapor exits turbine 64, it flows via conduit 126 into a condenser 66 where the vapor is liquified. The liquified thermodynamic medium exits condenser 66 through conduit 68 and is circulated, with the assistance of a pump 67, through conduit 69 to heat exchanger 70 and then through conduit 95 to be returned to the external heat source input for the system, such as, for example, a hydrocarbon boiler.

In such a system, the low temperature thermodynamic medium flowing through condenser 70 is the cooling medium for the absorption-refrigeration subsystem 63. Thus, as heat is removed from the vaporized refrigerant which has exited the generator 75 during the vaporization process, that heat is used as all, or a part of the heat energy input source for the thermodynamic medium circulating in the turbine system.

The low temperature engine system 64, which is driven by exhaust vapor from the bypassable turbine system 10, utilizes an absorption-refrigeration subsystem, generally designated at 63, to cool the low temperature thermodynamic medium. The absorption-refrigeration subsystem 63 includes a liquor that consists of a mixture of absorbent and refrigerant. Often, this absorbent-refrigerant liquor is a combination of two fluids, one having particularly useful absorption properties, and the other having refrigeration properties. This particular embodiment of absorption-refrigeration subsystem 63 includes an absorber 74, a condenser or evaporator 66, a heat exchanger 86, a generator 75 and a condenser 70. Heat is input into the absorption-refrigeration subsystem 63 via conduit 62 from the external heat source (not shown) for the entire system such as, for example, high temperature steam. After passing through the generator 75, the heat source steam condensate is returned to the external steam condensate return system or feed water return system through return pump 76.

The portion of the exhaust vapor from the multi-stage bypassable turbine system 10 which passes through conduit 26 is condensed in condenser 61 by the ambient coolant medium which is supplied and returned through coolant conduit 71. The heat input to generator 75 from the external source fractionally distills the refrigerant of the absorbent-refrigerant liquor within the generator 75. Such vaporized refrigerant then passes to the heat exchanger/condenser 70 in order to carry out the heat exchange whereby the vaporized refrigerant is liquified as it leaves through outlet port 77, and the low temperature thermodynamic medium is increased in heat content and temperature as it flows through the heat exchanger 70. Either at condenser 70 or before same, the condensed low temperature thermodynamic medium flowing through conduit 103 and the condensed even lower temperature thermodynamic medium flowing through conduit 69 are combined. As shown in FIG. 3, this combination is made within condenser 70 at point 104. These flows are combined to assure sufficient turbine medium flow to absorb all the waste heat available from condensation of the refrigerant.

Refrigerant passing through the outlet port 77, although now a liquid, is still at an elevated pressure for passage through an expansion valve 78. The expansion valve 78 reduces the pressure of the liquid refrigerant in order to facilitate a flash vaporization thereof as it enters the condenser/evaporator 66 at the temperature required to synthesize the sink conditions imparted to the low temperature thermodynamic medium as it flows through the condenser/evaporator 66. When the refrigerant leaves the condenser/evaporator 66 and enters the absorber 74, the refrigerant has absorbed the heat of condensation rejected by the low temperature thermodynamic medium from turbine system 64 and its temperature is slightly elevated from that after leaving the expansion valve 78.

Within the absorber 74, the refrigerant mixes with, preferably by meeting the spray of, warm absorbent-weak liquor of the absorbent-refrigerant solution. By this mixing, the refrigerant and the absorbent are combined as an absorbent-refrigerant liquor that is at a temperature greater than that provided to the absorber 74 by the external cooling source 82, typically by means of heat transfer elements 83, whereby the absorbent-refrigerant liquor is lowered in temperature to a temperature equal to or slightly greater than that of the external cooling source 82, while the cooling fluid is returned to the external cooling source 82 by a return conduit 84. This feature of cooling the absorbent-refrigerant liquor in the absorber 74 facilitates the process of solution formation, and higher concentrations of refrigerant are dissolved within the absorbent than would otherwise occur in an environment that is not so cooled. As the absorbent-refrigerant liquor temperature is lowered, such as, for example, by tracking a falling ambient coolant supply, the solution concentration may be increased or the pressure may be decreased along with a corresponding decrease in the matching evaporator pressure. This, in turn, permits a drop in the temperature at which the refrigerant may be supplied in 66 (i.e. —the synthesized sink temperature for the turbine medium).

The formed strong absorbent-refrigerant liquor is transported, typically with the assistance of a solution circulating pump 85, to a supplemental heat exchanger 86 where the strong liquor is warmed by hot, weak liquor absorbent solution which has been fractionally distilled within generator 75. The strong liquor passes through supplemental heat exchanger 86 to generator 75 while the weak liquor flows back to absorber 74. In doing so, the weak liquor passes through expansion valve 87 which reduces the pressure of the liquor from that of generator 75 to that of absorber 74.

Accordingly, the low temperature thermodynamic medium flowing through condenser 66 acts as part of the cooling medium for the refrigerant in subsystem 63.

As described above, when the temperature of the cooling medium in conduit 71 of condenser 61 is too warm or the flow rate too slow to achieve liquification of the vapor exiting from the lower pressure stage assembly 12, valve 23 is repositioned to direct the vapor flow into bypass conduit 27. The vapor thus bypasses low pressure stage assembly 12 traveling instead through bypass conduit 27 into condenser conduit 26. The liquified turbine medium passing through the absorption-refrigeration subsystem 63 is returned to the external heating source via conduit 100. When the bypass valve 23 is in the bypass position, clutch 15, if provided, is disengaged so that shafts 13 and 14 and their respective stages rotate independently.

As shown in phantom in FIG. 3, the low temperature engine system disclosed in U.S. Pat. No. 4,503,682 may also utilize a bypassable multi-stage turbine of the present invention in place of its conventional turbine 64. This bypassable multi-stage turbine indicated generally at 110 operates substantially identically to those systems described above and shown in FIGS. 1 and 2. Accordingly, a description of its operation has not been provided. Multi-stage turbine 110 includes a high pressure turbine assembly 111, one or more lower pressure turbine assemblies 112, shafts 113 and 114, clutch assembly 115, conduit 117, high pressure end 120, low pressure end 121, discharge conduit 122, to a bypass valve 123, linking conduit 124, discharge conduit 125, condenser conduit 126, bypass conduit 127, temperature sensors 128, flow meter 129, control system 180, and conductors 181 (shown in this embodiment as also linked to control the pressure settings of expansion valves 78 and 87).

In the embodiment illustrated in FIG. 3, a fraction of the exhaust vapor leaving turbine 11 is processed as described above through valve 23 and the remaining fraction is extracted through opening 105 to enter turbine system 64 at opening 107. The fraction of the thermodynamic medium circulating through turbine system 10 ideally should be the maximum amount that can be condensed at the evaporator conditions made available in condenser 66 by the absorption-refrigeration subsystem. The lower ambient cooling condition that permits the use of the lower bypassable stages 12 in the upper turbine system 10 also permit the absorption-refrigeration subsystem 63 to be operated to produce a lower refrigeration temperature in the evaporator 66. This lower refrigeration temperature permits the use of the bypassable turbine stage 112 in the low temperature turbine system 110. The same sort of control system sensors used to permit tracking variations in ambient temperature to determine the lowest useable turbine stage(s) to be placed in service in sub-ambient turbine system 64 can also control the refrigeration system pressure settings and flow controls to permit the lowest useable refrigeration temperature to similarly track variations in available ambient temperature and respond accordingly.

In a binary system such as that shown in FIG. 3, it is recognized that each of the thermodynamic cycles employed in the turbine and refrigeration subsystems of FIG. 3 may be improved by tracking the lowest ambient coolant source available, increasing the efficiency of the turbine cycles as the ambient temperature falls, and lowering the evaporator temperature made available by the absorption-refrigeration cycle as the ambient temperature falls and/or permitting a reduction in the mass of solution required in circulation for the same mass of refrigerant being processed.

As the ambient cooling temperature falls, the cooling or refrigeration capability of condenser 66 increases. Consequently, the thermodynamic medium traveling through sub-ambient turbine 64 can be expanded through the additional sub-ambient turbine stage 112 in order to extract additional work from the thermodynamic medium. If the temperature of the low temperature heat sink in condenser 66 is not low enough to allow the operation of the additional turbine stage 112 but is lower than that required to condense the medium exiting higher temperature sub-ambient turbine stage 111, the pumping effort of pump 85 can be reduced so that only enough refrigerant is pumped as necessary to condense the thermodynamic medium exiting turbine stage 111. Once the ambient cooling temperature falls sufficiently to lower the refrigerant temperature so as to allow the operation of lower pressure turbine stage 112 when pump 85 is pumping with its full effort, the thermodynamic medium is routed through the additional turbine stage 112 and the pump 85 is utilized to its maximum capability.

One skilled in the art will appreciate that the number of bypassable stages which can be used as part of the present invention is variable. By utilizing a greater number of bypassable stages, smaller temperature variations in the cooling medium may be utilized. A turbine power plant with many bypassable stages may operate at a greater overall efficiency by closely tracking even small variations in cooling medium temperature.

It will be appreciated that the embodiments of the present invention which have been described herein are merely illustrative of an application of the principles of the invention. Numerous modifications may be made by those skilled in the art without departing from the spirit and scope of the invention.

What is claimed is:

1. An improved multi-stage turbine system for power plants and the like, comprising:
   means for supplying a flow of heat energy as a vaporous thermodynamic medium;
   high pressure turbine means for extracting work from said vaporous thermodynamic medium, said high pressure turbine means having inlet means for receiving said vaporous thermodynamic medium;

means for discharging said thermodynamic medium from said high pressure turbine means as a reduced temperature and pressure thermodynamic medium to means for selectively directing the medium;

vapor liquification means downstream of said high pressure turbine means;

lower pressure turbine means downstream of said high pressure turbine means;

said selective directing means being for directing said reduced temperature and pressure thermodynamic medium either to said vapor liquification means or to said lower pressure turbine means;

said vapor liquification means being in fluid passing communication with a source of cooling medium;

said lower pressure turbine means being for extracting additional work from said reduced pressure and temperature thermodynamic medium discharged from said high pressure means, said lower pressure turbine means having inlet means for introducing the reduced temperature and pressure thermodynamic medium thereinto;

means for discharging said medium from said lower pressure turbine means as a further reduced temperature and pressure thermodynamic medium; and discharge conduit means for transporting the further reduced temperature and pressure medium from the discharge means of the lower pressure turbine means to said means for vapor liquification.

2. The turbine system of claim 1 which further comprises means for controlling said selective directing means whereby said reduced temperature and pressure medium bypasses said lower pressure turbine means in response to a predetermined increase in the temperature of said cooling medium source in communication with said vapor liquification means, and whereby said reduced temperature and pressure medium is directed to said lower pressure turbine means in response to a predetermined decrease in the temperature of said cooling medium source in communication with said vapor liquification means.

3. The turbine system of claim 1 which further comprises means for controlling said selective directing means whereby said reduced temperature and pressure medium bypasses said lower pressure turbine means in response to a predetermined combination of an increase in cooling medium source temperature and a decrease in cooling medium flow rate, and whereby said reduced temperature and pressure medium is directed to said lower pressure turbine means in response to a predetermined combination of a decrease in cooling medium source temperature and an increase in cooling medium flow rate.

4. The turbine system of claim 1 which further comprises means for releasably interlocking an output shaft of the high pressure turbine means with an output shaft of the lower pressure turbine means.

5. The turbine system of claim 4 wherein said output shaft of the high pressure turbine means is substantially axially aligned with said output shaft of the lower pressure turbine means.

6. The turbine system of claim 1, which further comprises:

lowest pressure turbine means for extracting additional work from said further reduced temperature and pressure thermodynamic medium discharged from said lower pressure turbine means; and another selective directing means for directing said further reduced temperature and pressure thermodynamic medium either to said vapor liquification means or to said lowest pressure turbine means.

7. The turbine system of claim 1, wherein said means for vapor liquification is a condenser having a cooling medium circulating therethrough.

8. The turbine system of claim 1, wherein said means for vapor liquification includes a condenser and an absorption-refrigeration subsystem for receiving and for synthesizing and imparting to said thermodynamic medium a continuous-flow low temperature heat sink at a selected temperature, said absorption-refrigeration subsystem having a circulating absorbent-refrigerant liquor; and an external cooling source for providing a cooling fluid in heat exchange communication with said absorbent-refrigerant liquor.

9. The turbine system of claim 8 wherein a low temperature turbine means for extracting work from said thermodynamic medium is positioned between said high pressure turbine means and said absorption-refrigeration subsystem.

10. The turbine system of claim 9 wherein said low temperature turbine means comprises:

another high pressure turbine means for extracting work from said thermodynamic medium, said another high pressure turbine means having inlet means for receiving said thermodynamic medium;

means for discharging said thermodynamic medium from said another high pressure turbine means as a reduced temperature and pressure thermodynamic medium to means for selectively directing the medium;

an absorption-refrigeration subsystem condenser downstream of said another high pressure turbine means;

another lower pressure turbine means downstream of said high pressure turbine means;

said selective directing means being for directing said reduced temperature and pressure thermodynamic medium either to said absorption-refrigeration subsystem condenser or to said another lower pressure turbine means;

said another lower pressure turbine means being for extracting additional work from said reduced pressure and temperature thermodynamic medium discharged from said another high pressure turbine means, said another lower pressure turbine means having inlet means for introducing the reduced temperature and pressure thermodynamic medium thereinto;

means for discharging said medium from said another lower pressure turbine means as a further reduced temperature and pressure thermodynamic medium; and discharge conduit means for transporting the further reduced temperature and pressure medium from the discharge means of the another lower pressure turbine means to said absorption-refrigeration subsystem condenser.

11. The turbine system of claim 10 wherein said reduced temperature and pressure thermodynamic medium is directed for liquefication thereof, and the pressure reducing valve adjustments controlling the temperature of the absorption refrigeration subsystem evaporator thereof are controlled in response to a predetermined increase or decrease in the cooling temperature of the external cooling fluid in heat exchange communication with the absorbent-refrigerant liquor in circulation in the absorption refrigeration subsystem thereof.

12. The turbine system of claim 1 in which said thermodynamic medium circulating therein is an organic fluid.

13. The turbine system of claim 1 wherein the cooling medium of said cooling medium source when same is in fluid communication with said vapor liquification means has a freezing point lower than the lowest temperature to which it is subjected when in use.

14. A method for providing an improved multi-stage turbine system for power plants and the like, comprising:
supplying a flow of heat energy as a vaporous thermodynamic medium to a high pressure turbine;
extracting work from said vaporous thermodynamic medium while same passes through said high pressure turbine;
discharging said thermodynamic medium from said high pressure turbine as a reduced temperature and pressure thermodynamic medium;
selectively directing said reduced temperature and pressure thermodynamic medium for liquification thereof or for passage to a lower pressure turbine;
extracting additional work from said reduced pressure and temperature thermodynamic medium discharged from said high pressure turbine while same passes through said lower pressure turbine;
discharging said thermodynamic medium from said lower pressure turbine as a further reduced temperature and pressure thermodynamic medium; and
transporting said further reduced temperature and pressure thermodynamic medium from the lower pressure turbine for liquification thereof.

15. The method of claim 14, wherein said reduced temperature and pressure thermodynamic medium is directed for liquification thereof with a cooling medium in response to a predetermined increase in the temperature of said cooling medium: and wherein said reduced temperature and pressure thermodynamic medium is directed to said lower pressure turbine in response to a predetermined decrease in the temperature of said cooling medium.

16. The method of claim 14, wherein said reduced temperature and pressure thermodynamic medium is directed for liquification thereof with a cooling medium in response to a predetermined combination of an increase in cooling medium temperature and a decrease in cooling medium flow rate, and wherein said reduced temperature and pressure thermodynamic medium is directed to said lower pressure turbine in response to a predetermined combination of a decrease in cooling medium temperature and an increase in cooling medium flow rate.

17. The method of claim 14 which further comprises releasably interlocking an output shaft of the high pressure turbine with an output shaft of the lower pressure turbine.

18. The method of claim 17 further including axially aligning the output shaft of the high pressure turbine with the output shaft of the lower pressure turbine.

19. The method of claim 14 in which said thermodynamic medium is an organic fluid.

20. The method of claim 14 wherein said cooling medium has a freezing point lower than the lowest ambient temperature to which it is subjected when in use.

* * * * *